United States Patent Office 2,949,075
Patented Aug. 16, 1960

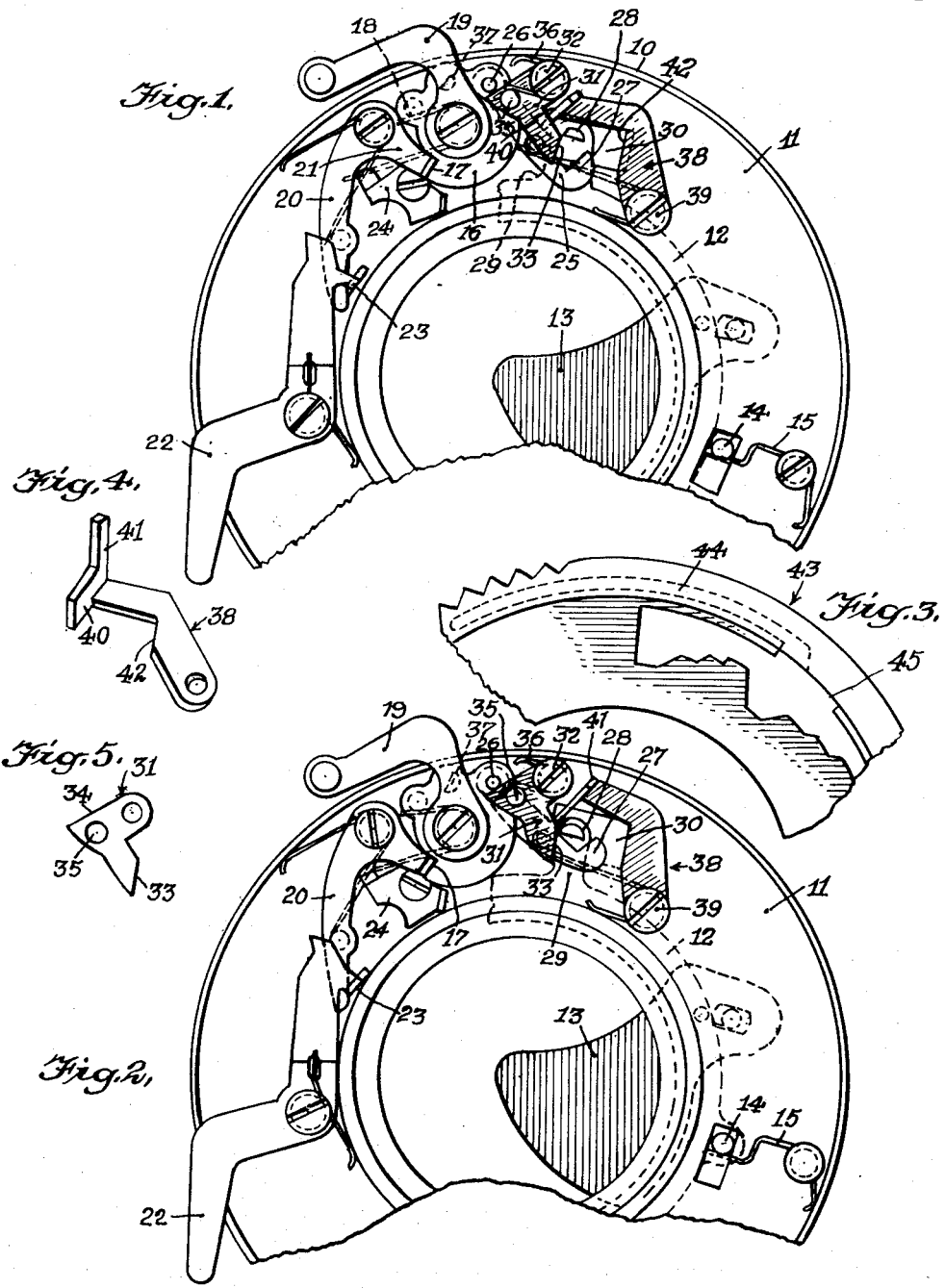

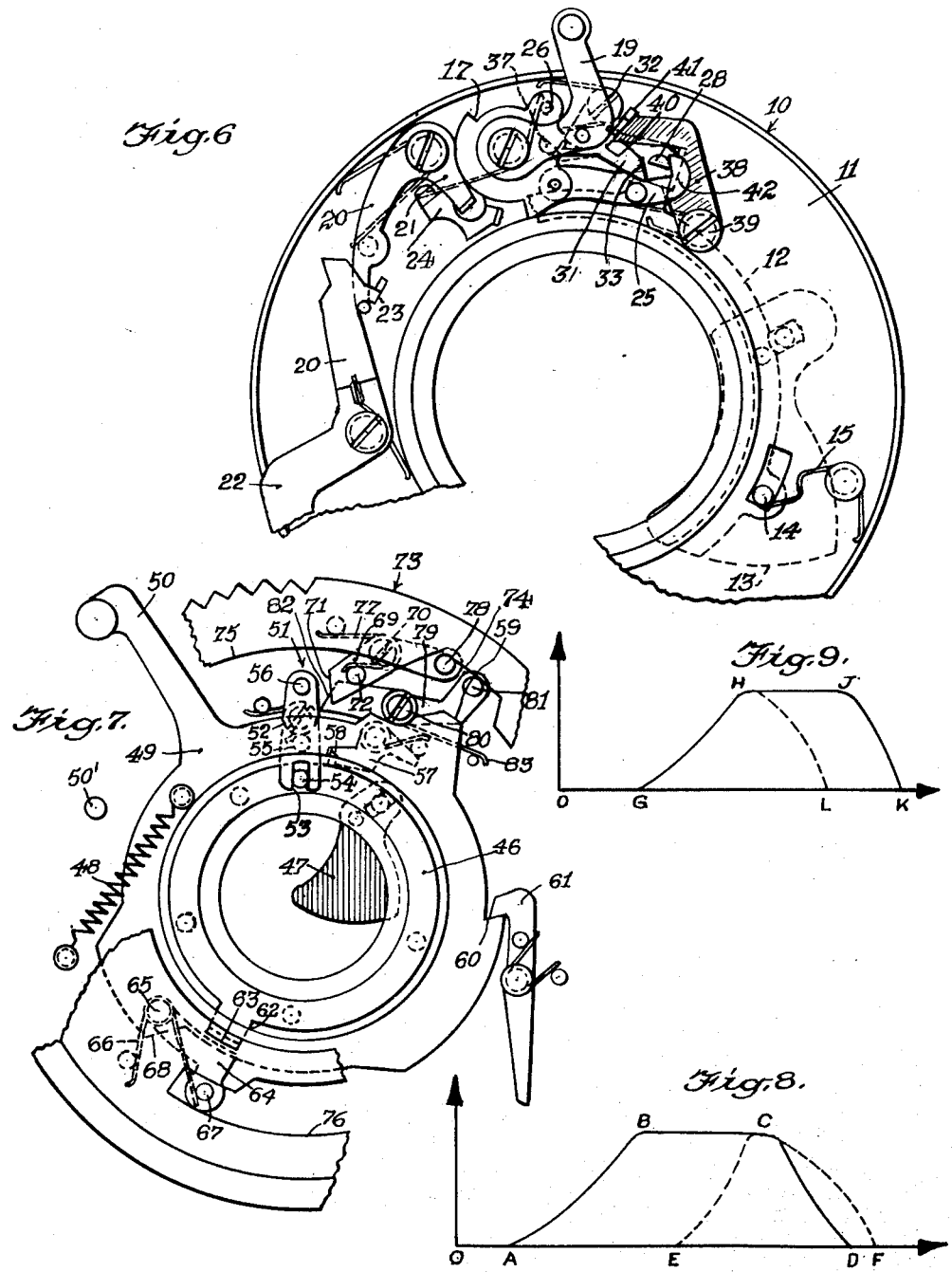

2,949,075

INTRA LENS SHUTTER

Waldemar T. Rentschler, Calmbach, Enz, Germany, assignor to Alfred Gauthier G.m.b.H., Calmbach, Enz, Germany, a corporation of Germany Filed Mar. 15, 1954, Ser. No. 416,292

Claims priority, application Germany Mar. 18, 1953

4 Claims. (Cl. 95—63)

This invention relates to camera shutters and more particularly to intra-lens shutters having reversibly movable shutter blades.

Heretofore intra lens shutters having reversibly movable shutter blades were so constructed that there was a time lag between the fully open position of the shutter and the beginning of the closing movement. It was customary during this time lag period to achieve different exposure times by means of a slow speed assembly. However, with the construction generally provided, there was a time lag period between the opening of the shutter and the closing motion thereof even though the slow speed assembly was disengaged and inoperative. The total cycle of operation of such a shutter therefore comprises an opening time, a so-called full open time, and a closing time. The full open time is the time lag period hereinbefore set forth and is present even under the most advantageous conditions, considering the moments of inertia of moving parts and the maximum spring tension. It has been found that the full open time generally is a period of from one-half to one m.sec. even with the most favorable conditions. Instantaneous opening and closing of the shutter, which is oftentimes very desirable, is therefore not possible because of the duration of the so-called full open time. In addition, heretofore, considerable spring tension was required to impede the setting of the shutter in order to obtain short exposure time.

It is an object of the present invention to provide an intra lens shutter of the type described so constructed as to substantially reduce the time of the aforesaid total cycle of operation of the shutter.

It is a further object of the present invention to provide a shutter which requires the application of less motive energy than heretofore required for similar shutters.

A feature of the present invention is the provision of a shutter in which any time lag between the opening and closing of the shutter is eliminated.

Another feature of the present invention is the provision of means whereby the mechanism accomplishing the desired results can be manually or automatically actuated.

Still another feature of the present invention is the provision of means which may be added to shutters presently in use to enable them to obtain the desired results set forth.

Still another feature of the present invention is the provision of means which will reflect the impulses of moving parts to lessen the motive energies required to operate the device.

Still another feature of the present invention is the provision of a shutter of the type described having all of the aforesaid advantages which is nevertheless economical to manufacture and simple to construct.

Other objects, features and advantages are set forth in greater detail in the following description taken in conjunction with the accompanying drawings in which:

Fig. 1 is a fragmentary front view of the intra lens shutter of the present invention in set position;

Fig. 2 is a fragmentary front view of the intra lens shutter in set position with a means for instantaneously opening and closing the shutter in inoperative position;

Fig. 3 is a fragmentary front view of the speed setting ring of the intra lens shutter;

Fig. 4 is a perspective view of a lever used in the present invention;

Fig. 5 is a side elevation view of another lever used in the present invention;

Fig. 6 is a fragmentary front view of the intra lens shutter of the present invention showing the shutter blades in open position;

Fig. 7 is a fragmentary front view of a modified form of the present invention;

Fig. 8 is a time diagram of the action of the intra lens shutter; and

Fig. 9 is a time diagram of the action of the intra lens shutter in the modified form shown in Fig. 7.

Referring to the drawings, and particularly Figs. 1, 2 and 6, there is shown a shutter housing 10 having a base plate 11. A blade ring 12 connected with a shutter blade 13, only one of which is shown for the purposes of clarity, is rotatably supported on the base plate 11. The blade ring 12 is provided with a pin 14 which is engaged by a spring 15 normally maintaining the shutter blade 13 in closed position. A spring housing 16 provided with a shoulder 17 for the purposes hereinafter set forth, and a drive spring 18, is mounted on the base plate 11. The spring housing 16 is secured to a cocking lever 19 whereby the drive spring 18 is maintained under tension when the shutter blade is in closed position. A locking lever 20 is pivotally mounted on the base plate 11. The extremity of one arm 21 abuts the shoulder 17 of the spring housing 16 when the intra lens shutter is in set position, as shown in Fig. 1. A release lever 22 provided with an offset lug 23 is pivotally mounted on the base plate 11. A stop plate 24 having one extremity engaging the drive spring 18 is secured to the base plate 11 for the purposes hereinafter set forth.

An action pawl 25 is pivotally secured around the post 26 to the spring housing 16. The action pawl 25 is provided with a hook 27 which heretofore in the operation of the intra lens shutter engages a semi-circular pin 28 connected to an arm 29 of the blade ring 12, as shown in Fig. 2. The said pin 28 projects through a recess 30 provided in the base plate. When the setting operation is complete, as shown in Fig. 2, pressure applied to the release lever 22 causes the offset lug 23 to move the arm 21 of the locking lever 20 out of engagement with the shoulder 17 of the spring housing 16. The spring housing turns in a clockwise direction moving the action pawl 25 in counterclockwise direction. This movement causes the blade ring 12 to move in a clockwise direction by means of the engagement of the pawl 25 with the pin 28 on the arm 29 of the blade ring 12. The shutter blade 13 is mounted on the blade ring 12 is rotated to open position about its rotatable support on base plate 11. When the hook 27 meets the end of the recess 30, clockwise movement of the blade ring 12 is stopped. After a small turning period of the spring housing 16, the full open time is terminated and the engagement of the action pawl 25 with the semi-circular pin 28 now causes the closing of the shutter in well known manner. The closing is effected by a counter clockwise movement of the blade ring 12. After the closing of the shutter the spring housing 16 is stopped by the stop plate 24. The device may then be reset to set position by counterclockwise movement of the cocking lever 19. In Fig. 8 a time diagram of the exposure time of the known method of the operation is set forth. Point "O" represents the moment that the spring housing 16 is released. Because the different shutter blades overlap in order to completely exclude the light, the shutter opening is not uncovered at once but rather at point A. At point B the shutter blades have uncovered the shutter opening completely. The line AB therefore represents the opening time of the shutter. This occurs while the action pawl is still moving in a clockwise direction causing the blade ring 12 to be moved by means of the pin 28 as hereinbefore described. Before the hook 27 meets the end of the recess 30, there is a time lag signified by the line BC in Fig. 8. When the hook 27 meets the end of the recess 30, the return movement to close the shutter begins as hereinbefore set forth. This closing time of the shutter is exemplified by the line CD in Fig. 8. Thus the total open time or cycle of operation of the shutter in the well-known method is shown in the line ABCD.

According to the present invention there is provided an angle lever 31 pivotally secured around a shaft 32 to the base plate 11. The angle lever 31 is provided with two cam surfaces 33 and 34 and a pin 35. The angle lever is located between the spring housing 16 and the pin 28 on the arm 29 of the blade ring 12, as shown in Fig. 1. A light spring 36 secured to the pin 35, as shown, normally urges the upper portion of the cam surface 33 against the pin 28. The lower portion of the cam surface 34 is within the path of movement of a semi-circular pin 37 located on the cocking lever 19 for the purposes hereinafter set forth.

There is also provided a unique swivel lever 38 pivotally secured around a shaft 39 to the base plate 11. The lever is provided with an arm 40 and a finger 41 at right angles to the arm. The lever 38 is so constructed as to provide a stop 42 for the purposes hereinafter set forth. As shown in Fig. 3, the shutter is normally provided with a speed setting ring 43 which is secured within the base plate 11. The speed setting ring 43 is provided with a groove 44 extending through part of the ring, as shown in Fig. 3, and a cam surface 45. In the operation of the shutter according to the present invention and utilizing the means set forth to virtually instantaneously open and close the shutter blade, the speed setting ring 43 is set in the position with the finger 41 resting against the cam surface 45. In this position the arm 40 of the lever 38 urges the pawl 25 away from the semi-circular pin 28 so that the hook 27 is disengaged from the pin. It is to be understood that any slow speed assembly (not shown) is in inoperative position during this operation wherein it is desired to effect virtually instantaneous opening and closing of the shutter. With this construction and in this position when the spring housing 16 is released in the manner described hereinbefore, its initial turning action has no effect on the pin 28, the arm 29 and the blade ring 12 because of the disengagement of the hook 27 from the pin 28, until the pin 37 engages the lower portion of the cam 34. During this period the acceleration of the spring housing is rapidly increased. Upon the engagement of the pin 37 with the lower portion of the cam surface 34, (these parts constituting a multi-part, separable, abutting, driving connection) the lever 31 is turned in a counterclockwise direction whereby the cam surface 33 moves the pin 28 in a clockwise direction carrying with it the arm 29 and the blade ring 12 whereby the shutter is virtually instantaneously opened. Immediately prior to the full opening of the shutter, the pin 37 disengages from or bypasses the cam surface 34 of the lever 31.

The pin 28 carried by the arm 29 continues its clockwise movement for a very limited time under the initial thrust and strikes the stop 42 of the angle lever 38. This occurs at the moment that the shutter is completely opened. The rebound of the pin 28 against the stop 42 causes the pin to begin to return to its original position. This moment is shown in the drawing in Fig. 6. The remaining return action is immediately taken up by the action pawl 25, which is now in a position to engage with the pin 28. Thus the action pawl 25 effects the closing of the shutter as hereinbefore described. The resetting operation can then take place in the usual way by counter-blockwise movement of the cocking lever 19. In this movement the pin 37 engages the undersurface of the lever 31 to move it slightly out of the path while the pin is returning to its original position.

In Fig. 8 in dotted lines there is shown a time diagram of the shutter blade movement with the use of the present invention. Because of the fact as aforesaid that the beginning of the opening of the shutter blades does not correspond with the beginning of the clockwise movement of the spring housing 16 but rather is delayed until the pin 37 engages the cam 34, the opening of the shutter blade does not begin until point E as shown in the diagram. Because of the higher speed of acceleration of the spring housing 16 at this point, the opening of the shutter blade is very rapid. The shutter blade movement is then reversed at point C and closing time is shown in dotted lines CF. As the acceleration of the shutter blades for the closing movement begins at point C, the closing time is somewhat slower with the use of this invention. However, the total open time signified by the line ECF is obviously considerably less than the total open time shown by the line ABCD, whereby virtually instantaneous opening and closing of the shutter blade is effected with the use of the present invention. Should it be desired for any reason to render inoperative the means above described for virtually instantaneously opening and closing the shutter blade, it is only necessary to set the speed setting ring 43 in a position where the finger 41 rides in the groove 44. In this position, as shown in Fig. 2, the arm 40 of the swivel lever 38 does not engage the action pawl 25 at any part thereof and the action pawl is permitted to grip the pin 28 in the well-known manner. The opening and shutting of the shutter blade then takes place as hereinbefore described in the usual way and the generally known slow-speed assembly, not shown, can be utilized for a definite exposure time in the well-known way. Thus while the device of the present invention may be utilized to effect virtually instantaneous opening and closing of the shutter, it may also be disengaged when it is desired to obtain longer exposure times.

In the modified form of the present invention, as shown in Fig. 7, there is shown a blade ring 46 connected with a shutter blade 47, only one of which is shown for the purposes of clarity. The spring 48 is secured at one end to a ring 49 having a handle 50 whose movement is limited by the pin 50'. There is provided a lever 51 pivotally mounted to the base plate by a shaft 52. The base of the lever 51 is provided with a crotch 53 embracing a pin 54 on the blade ring 46. The lever 51 is also provided with a pin 55 at its central portion and a pin 56 at its upper portion for the purposes hereinafter set forth. A lever 57 having a bent-off lug portion 58 is mounted in a spring bearing on the ring 49. The ring 49 is provided with a projection 59. The ring 49 is also provided with a shoulder 60 which, when the shutter is in set position, is engaged by a locking lever 61. An arm 62 on the blade ring 46 has a bent-off lug portion 63. A swivel lever 64 is rotatably mounted around the shaft 65 and is controlled by the spring 66. The lever 64 is provided with a pin 67 for the purposes hereinafter set forth. The ring 49 is provided with a cam surface 68. In the heretofore known operation of this described form of intra lens shutters pressure applied against the locking lever 61 removes it from engagement with the shoulder 60 on the ring 49 whereby the ring 49 will be moved in a counterclockwise direction by the spring 48. The bent-off lug portion 58 of the lever 57 carried by the ring 49 moves into engagement with the pin 55 on the lever 51. This engagement causes a swiveling clockwise movement of the lever 51 carrying with it the pin 54, which in turn moves the blade ring 46 to open the shutter blade 47. At the same time, the lever 64 is urged by the spring 66 towards the lug 63 on the arm 62 and the blade ring 46. At the moment when the shutter blade is in fully open position, the lever 64 drops behind the lug 63 and prevents the return movement of the blade ring 46 to close the shutter blade 47. The shutter is held in open position until the edge of the projection 59 engages the pin 56 on the lever 51. At the time of the engagement the cam surface 68 on the ring 49 has urged this lever 64 to a position where the lug 63 is released. The engagement of the edge of the projection 59 with the pin 56 causes the lever 51 to move in a counterclockwise direction carrying with it the pin 54 and blade ring 46 to close the shutter blade 47.

In Fig. 9 there is shown in solid lines a time diagram of the opening and closing movement of the shutter blade in this operation with the well-known slow speed assembly (not shown) in inoperative position. Point O indicates the moment when the ring 49 is released from the lever 61. During the time OG the movement of the ring 49 does not influence the shutter blades. At the movement signified by G the lug 58 of the lever 57 engages the pin 55 on the lever 51 to begin to open the shutter. This opening time is signified by the line GH. At the moment signified by H the shutter is in fully open position and the lever 64 has dropped behind the lug 63 as hereinbefore described. During the open time signified by HJ the ring 49 continues to turn in a counterclockwise direction until the edge of the projection 59 engages the pin 56 on the lever 51. This moment is signified by J in Fig. 9. At this moment also the lug 63 is released as aforesaid. The shutter blade then closes by the engagement of the edge of the projection with the pin on the lever causing it to move in a counterclockwise position carrying with it the blade ring 46 which in turn closes the shutter blade 47. This closing time is signified by the line JK on the time diagram in Fig. 9. The total cycle of operation or total open time is therefore the line GHJK shown in the drawing.

According to the present invention in the modified form shown in Fig. 7, there is provided an angle lever 69 pivotally secured around the shaft 70 to the base plate. The angle lever 69 is provided with an edge 71 and a pin 72. The angle lever is located between the lever 51 and the projection 59 on the ring 49 as shown in Fig. 7. The shutter is normally provided with a speed setting ring 73 secured to the base plate and having cam surfaces 74, 75 and a cam 76. A light spring 77 secured to the pin 72 urges another pin 78 on the lever 69 into predetermined engagement with cam surface 74 or 75.

There is also provided a lever 79 having two arms pivotally secured around the shaft 80, one arm of which is provided with a pin 81 and the other arm being provided with a stop edge portion 82. A spring 83 secured to the pin 80 urges the pin 81 of the lever 79 into predetermined engagement with the cam surface 74 or 75 for the purposes hereinafter set forth.

In the operation of the shutter according to this form of the present invention, and using the means set forth to virtually instantaneously open and close the shutter blade, the speed setting ring 73 is set in the position where the pin 78 on the angle lever 69 and the pin 81 on the lever 79 engage with the cam surface 74 of the speed setting ring. This position is shown in Fig. 7. It is to be understood that any slow speed assembly (not shown) is in inoperative position. After releasing the set shutter the opening of the shutter is the same as hereinbefore described and as set forth as the line OGH on the time diagram in Fig. 9. At the moment signified by H however, according to the present invention, the pin 56 on the lever 51 engages the stop edge 82 of the lever 79 which causes a rebound action of the lever 51, the blade ring 46 and the shutter blade 47 to take place. At the same moment the projection 59 on the ring 49 engages the pin 72 of the lever 69 whereby the lever 69 begins to move in a clockwise direction. The edge 71 of the lever 69 engages the pin 56 of the lever 51 causing the lever to turn in a counterclockwise direction carrying with it the pin 54 on the blade ring 46 closing the shutter 47. The guide through the narrow portion of the cam 76 prevents the lever 64 from blocking the blade ring 46 on the arm 62 and bent-off lug 63.

The adjustment of the stop edge 82 of the lever 79 and the edge 71 of the lever 69 is such that the edge 71 effects the pin 56 only after the pin 56 has engaged the stop edge 82 of the lever 79. Therefore rapid re-acceleration of the shutter blades is achieved without the shock which results on the blade ring 46 by the return movement of the lever 51 in the heretofore known operation of the shutter.

As shown in the diagram in Fig. 9 the total open time or total cycle of operation with the use of this invention is signified by the line GHL. While the closing time HL is slightly more than the closing time JK, it will be noted that the total open time GHL with the use of this invention is considerably less than the total open GHJK, whereby virtually instantaneous opening and closing of the shutter is effected.

Should it be desired for any reason to render inoperative the means above described for virtually instantaneously opening and closing the shutter blade, it is only necessary to set the speed setting ring in a position wherein the pin 78 on the angle lever 69 and the pin 81 on the lever 79 engage with the cam surface 75 on the speed setting ring instead of engaging the cam surface 74. In this position the angle lever 69 and the lever 79 are moved out of the path of the lever 51 and the projection 59 and has no effect on the movement thereof. With this adjustment the pin 67 is in the wide part of the cam 76 and the normal operation takes place as hereinbefore described in the usual way and the generally known slow-speed assembly, not shown, can be utilized for a definite exposure time in the well-known way. Thus, the modified form of this invention may also be utilized to effect virtually instantaneous opening and closing of the shutter or be disengaged when it is desired to obtain longer exposure time.

It is to be noted in the drawings that only one main spring is shown. However, additional springs, of course, can be utilized. In describing the invention there has been reference to a special stop means providing for rebound at the time of the attaining of the fully opened position of the shutter blades in order to achieve the most advantageous results. It will be understood that such stop means may not be necessary if the mass conditions between the acting components on the one hand and the blade ring on the other hand differ substantially. The provision of such stop means, however, is extremely desirous in those instances where the magnitude of the acting components on the one hand and the shutter blades and the blade ring on the other hand, do not differ substantially.

The invention provides a construction for an intra lens shutter which is reversibly movable wherein by adjustments of the speed setting ring and without the operation of the well-known slow speed assembly, the time lag period between the full opening of the shutter and the beginning of its closing time is virtually eliminated. Of course, generally known shutter types are still advantageously usable with other adjustments of the speed setting device to obtain longer exposure times and the like.

It is to be noted in addition that generally known constructions for shutters are not required to be extensively changed to utilize the advantages of this invention. The invention may be used for virtually instantaneous opening and closing of the shutter blades or the parts may be disengaged so that a slow speed assembly operation can be fully retained.

Of great importance is the fact that by the construction disclosed hereinabove virtually instantaneous opening and closing of the shutters is achieved with less operating energy than has been utilized heretofore. This is of prime importance concerning the coupling of the shutter setting process with the action of the film transfer.

While the invention has been described in detail, it will be understood that variations and modifications may be made without departing from the spirit of the invention or the scope of the appended claims.

I claim:

1. A camera shutter comprising at least on reversibly movable member, means connected to said shutter comprising an element engageable for opening and closing movement of said shutter, said element having a shutter opening movement and a shutter closing movement; a spring charged means operable to move said element to open and close said shutter, means for selectively effecting one of two different modes of operation of said shutter by said spring charged means including a first movable actuating member and a second movable actuating member, said first movable actuating member being movable by said spring charged means in abutting engagement with said element to effect opening and closing movement of said element and said shutter, said spring charged means having a normal path of movement while effecting opening and closing movement of said shutter, said first movable actuating member being movable by said spring charged means in a forward and a reverse direction to effect respectively, the opening and closing movements of said shutter through said first movable actuating member's abutting engagement with said element, said second movable actuating member being operable in abutting connection with said element to move said element through its shutter opening movement, means for connecting said second movable actuating member to said spring charged means for operation of said element through shutter opening movement by said second movable actuating member, the latter means being operative to connect said second movable actuating member to said spring charged means upon movement of said spring charged means through a portion of its said normal path and after initial movement of said first movable actuating member in said forward direction, said first movable actuating member being normally operative through movement in the latter direction to effect opening of said shutter, means operably engageable with said first movable actuating member to alter its path of movement in said first direction so that said first movable actuating member does not cause shutter opening movement of said element and said shutter while moving in said forward direction and so that shutter opening movement of said element and said shutter is effected by said recond movable actuating member, said first movable actuating member being operative to close said shutter through movement by said spring charged means in said reverse direction whenever said shutter is opened by said spring charged means, said second movable actuating member being mounted for effective engagement with said element during opening movement of said shutter only.

2. The camera shutter of claim 1 wherein the spring charged means and the second movable actuating member are carried by stationary pivots fixed with respect to each other.

3. The camera of claim 1 including said first movable actuating member being pivotally carried by said spring charged member.

4. The camera of claim 1 including means for selectively rendering inoperative either said first movable actuating member or said second movable actuating member to open said shutter.

References Cited in the file of this patent

UNITED STATES PATENTS

| | | |
|---|---|---|
| 1,629,534 | Riddell | May 24, 1927 |
| 1,963,324 | Deckel et al. | June 19, 1934 |
| 2,176,621 | Brueck | Oct. 17, 1939 |